July 31, 1928. 1,679,226
J. R. MITRO
AIR COMPRESSOR
Filed July 24, 1925 2 Sheets-Sheet 1
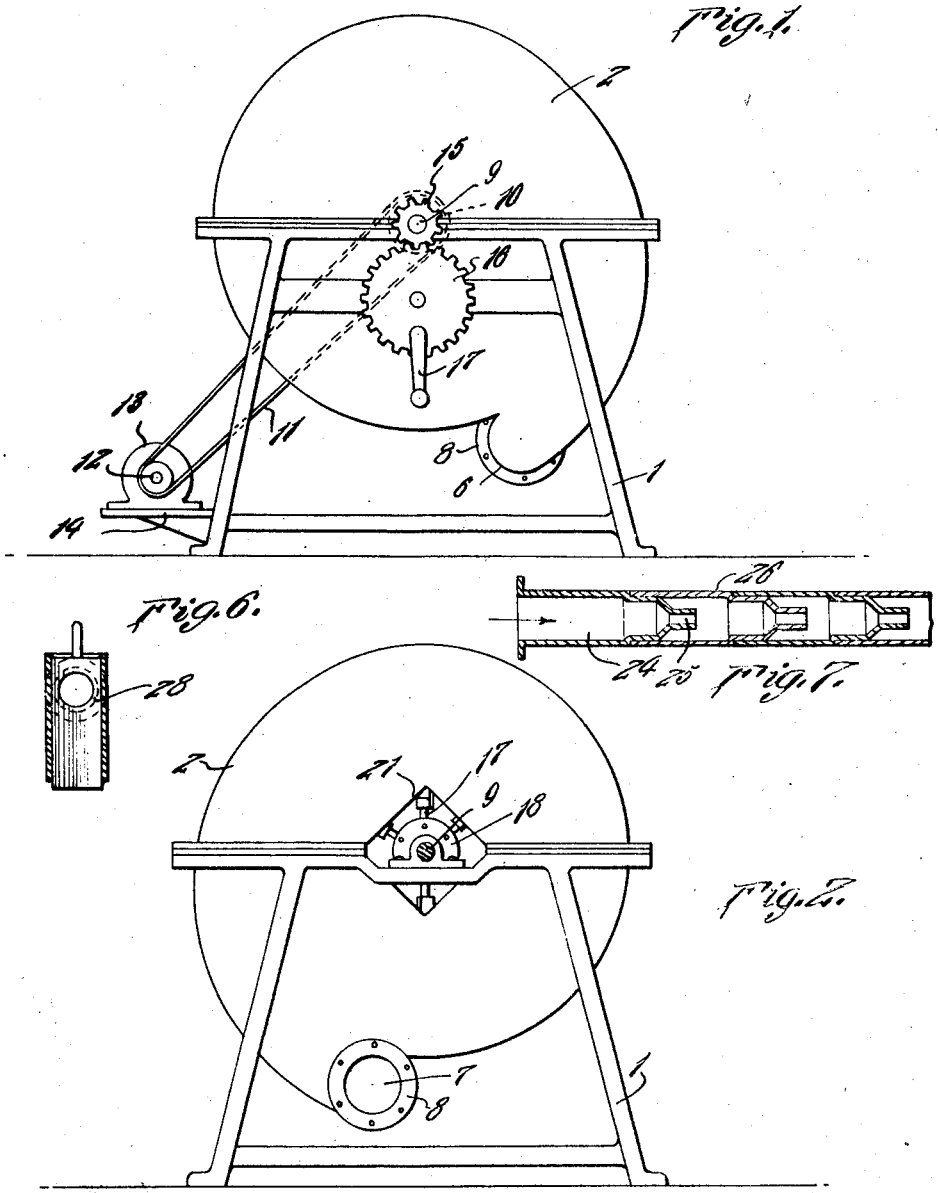

July 31, 1928.
J. R. MITRO
AIR COMPRESSOR
Filed July 24, 1925
1,679,226
2 Sheets-Sheet 2
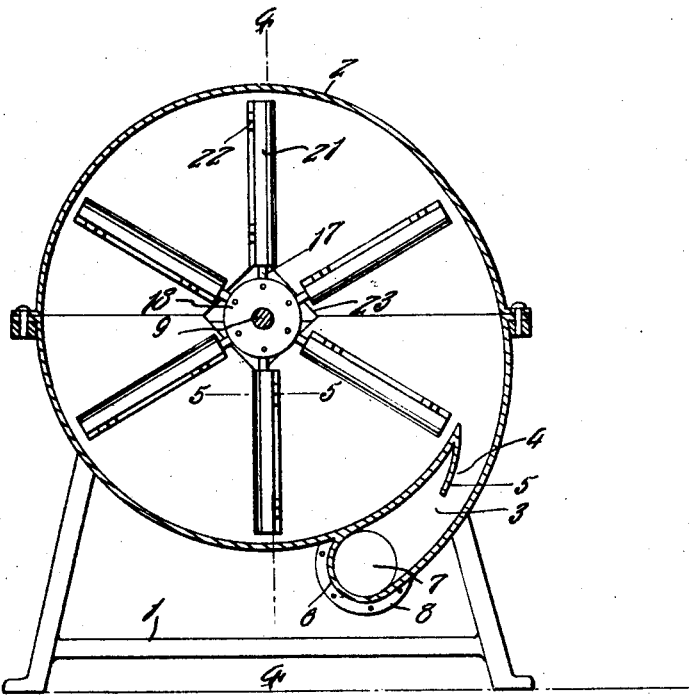
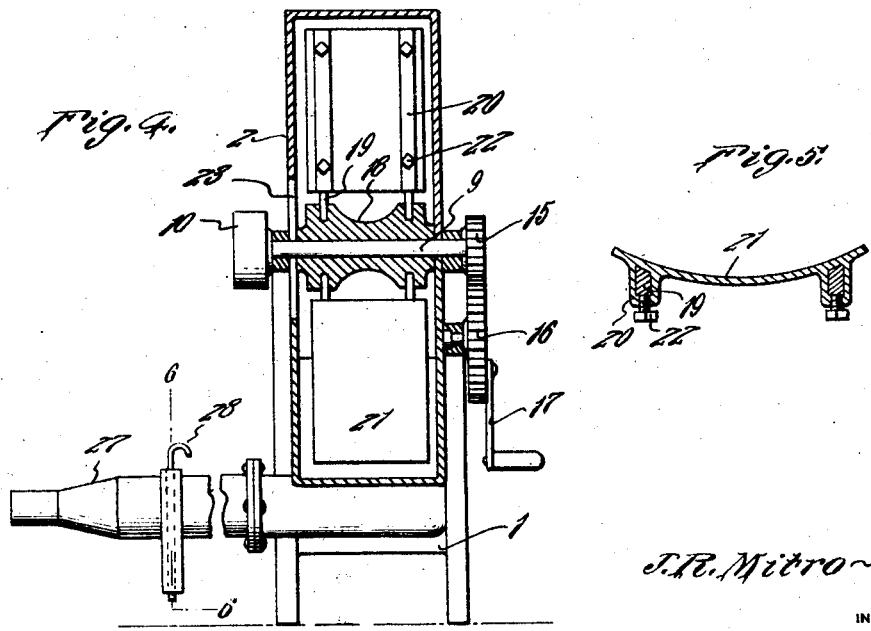

Patented July 31, 1928.

1,679,226

UNITED STATES PATENT OFFICE.

JOHN R. MITRO, OF KINCAID, ILLINOIS.

AIR COMPRESSOR.

Application filed July 24, 1925. Serial No. 45,878.

My present invention has reference to an air compressor.

My object is the provision of an air compressor in which a fan is revoluble in a suitable casing the latter being integrally formed with an air duct or passage having a trap therein for preventing the outflow of air therefrom and for likewise compressing the air in the duct, the said duct having a lateral outlet to which is connected any desired number of traps, in the nature of reducing nipples, and other couplings whereby the compressed air may be delivered at any distance required away from the fan.

This invention also consists in certain other features of construction and in the combination and arrangement of the several parts, to be hereinafter fully described, illustrated in the accompanying drawings and specifically pointed out in the appended claim.

In describing my invention in detail, reference will be had to the drawings wherein like characters denote like or corresponding parts throughout the several views, and in which:—

Figure 1 is a side elevation of the improvement.

Figure 2 is a view looking toward the opposite side thereof.

Figure 3 is an approximately central vertical longitudinal sectional view therethrough.

Figure 4 is a sectional view approximately on the line 4—4 of Figure 3.

Figure 5 is a sectional view approximately on the line 5—5 of Figure 3.

Figure 6 is a sectional view approximately on the line 6—6 of Figure 4.

Figure 7 is a sectional view through the air conductor.

Upon a suitable stand 1 there is supported the casing 2 of the improvement. The casing 2 is made up of two sections which have their confronting ends flanged and securely bolted together. The casing is approximately cylindrical in plan, but the sides and outer periphery, at what I will term the rear thereof, are extended, to form a duct 3. The lower wall of the casing proper is provided with an opening 4 which communicates with the duct 3, and the said lower wall is formed with an angle flange 5 which is directed inwardly with respect to the duct. The duct terminates in a rounded wall 6 to one side of the center of the bottom of the casing. The duct has a side opening 7, and the said opening is surrounded by a flange 8.

Journaled in suitable bearings on the top of the frame 1, and extending transversely through the casing 2, there is a shaft 9. On one end of the shaft there is a pulley wheel 10 which is designed to receive an endless belt 11 therearound, the said belt 11 being also trained around a pulley wheel 12 on the shaft of a motor 13. The motor is supported upon a stand 14 that is preferably integrally formed on one end of the frame 1. The opposite end of the shaft is provided with a pinion 15 that is in mesh with a gear 16 whose shaft is suitably journaled on the frame. The gear 16 is preferably removably associated with the frame and is provided with a detachable handle 17. The gear 16 is employed only when the shaft 9 is to be revolved by hand.

Fixed on the shaft and received in the casing 1, there is a hub 18. This hub is peripherally provided with radiating spokes 19 which are arranged in opposite pairs. The spokes are received through sockets 20 on the convex faces of cross sectionally concavo-convex blades 21. The spokes 19 are adjustably and removably secured in the sockets 20 by binding elements 22.

As far as the description has progressed it will be noted that when the fan constituting the hub and its blades is revolved, the air which enters an opening 23 in one side of the casing will be rapidly forced toward what I will term the rear of the casing, and will be forced into the duct 3. As the duct is gradually widened from its connection with the casing to its outlet end 7 and is likewise provided with the trap flange 5, the air will be compressed in the said duct providing the passage 7 is closed.

Removably secured to the flange 8 that surrounds the outlet passage in the duct there is a pipe member in the nature of a reducing nipple 24. This pipe member has arranged on its reduced outer end, inward of its restricted pipe outlet 25, the widened portions of other and similarly constructed reducing nipples 26, respectively. The associated reducing nipples serve as traps for the air forced therethrough so that a back flow of air is prevented and the air is consequently compressed in the nipples. An outlet pipe 27 is connected to the outer nipple and this pipe has its passage preferably controlled by a gate valve 28. Of course, any desired number of couplings, which, also of course, may be variously shaped are connected to the pipe members which I have termed the nipples 24 and 26, so that compressed air will be directed to a desired point away from the fan.

It is obvious that air outlets may be arranged upon the opposite sides of the casing. Also if desired, a fan propeller may be arranged in this part of the casing, the shaft thereof being journaled in suitable bearings and one end of the shaft may be provided with a fly wheel and the other end with a pulley wheel whereby suitable mechanism may be driven.

It is thought that the foregoing description when taken in connection with the drawings will fully set forth the construction and operation of my improvement to those skilled in the art to which such invention relates, but I desire it to be understood that I do not wish to be limited to the structural features herein set forth and may make such changes therefrom as fairly fall within the scope of what I claim.

Having described the invention, I claim:

A casing of cylindrical formation for a centrifugal air compressor, said casing having an offset side merging into a duct at the air outlet of the casing, and the inner wall provided by the opening having an angle flange extending into the duct, the end wall of the duct being rounded and merging into the casing and having an outlet at one side thereof, and a nozzle connected to the outlet, and whereby the air forced by the compressor into the duct will contact with the end wall thereof, the backward rush of air will be resisted by the flange in the duct to prevent the reentrance thereof into the casing and the air caused to circulate in the duct will be forcibly ejected through the nozzle.

In testimony whereof I affix my signature.

JOHN R. MITRO.